United States Patent

[11] 3,625,525

[72] Inventor Carlisle R. Davis, Jr.
   Grand Blanc, Mich.
[21] Appl. No. 71,398
[22] Filed Sept. 11, 1970
[45] Patented Dec. 7, 1971
[73] Assignee General Motors Corporation
   Detroit, Mich.
   Original application June 21, 1967, Ser.
   No. 647,674, now Patent No. 3,554,562,
   dated Jan. 12, 1971. Divided and this
   application Sept. 11, 1970, Ser. No. 71,398

[54] VALVE STEAM SEAL ASSEMBLY
   5 Claims, 7 Drawing Figs.
[52] U.S. Cl. .................................................. 277/148,
   277/212
[51] Int. Cl. ................................................. F16j 9/06
[50] Field of Search ........................................ 277/138,
   148, 188, 205, 212, 149; 251/337; 123/188 P

[56] References Cited
   UNITED STATES PATENTS
| | | | |
|---|---|---|---|
| 3,114,561 | 12/1963 | Creath et al. .................. | 277/205 X |
| 3,306,620 | 2/1967 | Taschenberg .................. | 277/188 X |
| 3,346,267 | 10/1967 | Farley .......................... | 277/148 X |
| 3,554,562 | 1/1971 | Davis ............................ | 277/205 |

Primary Examiner—Robert I. Smith
Attorneys—J. L. Carpenter and Robert J. Outland ABSTRACT: A valve stem seal assembly formed from a thin sheet of wear-resistant filled Teflon assembled with a sheet metal retainer to provide an extended lip urged to sealing engagement with the valve stem by resilient fingers of the retainer and having means to seal against and retain the assembly on the valve guide. One embodiment is installed on the valve guide in a partially formed state and the final configuration of the lip and resilient fingers is formed after assembly to correct for eccentricity of the valve guide and the seal mounting.

INVENTOR.
Carlisle R. Davis, Jr.
BY
Robert J. Outland
ATTORNEY

VALVE STEAM SEAL ASSEMBLY application is a division of application Ser. No. 647,674 filed June 21, 1967 now U.S. Pat. No. 3,554,562.

This invention relates to valve stem seals and, more particularly, to a seal assembly for use in an internal combustion engine to control the leakage of lubricating oil from the rocker compartment through the valve guides and into the engine combustion chamber.

In modern overhead valve internal combustion engines of the automotive type, it is known to utilize seals between the valve guides and the valve stems which extend therethrough in order to control the leakage of lubricating oil through the valve guides. This is particularly important in the case of the intake valves since the reduced pressure of the intake passages tends to draw substantial amounts of oil through the clearance between the valve and the valve guide if adequate means are not utilized to prevent it. Such seals are, however, also used on engine exhaust valves.

To perform its function, a valve stem seal must provide adequately for misalignment between the valve stem and the mounting location of the seal on the valve guide. Further, it must have a long-wear life to match the extended periods between overhauls which are common in today's engines. In addition, the fact that a seal is used on each valve of an engine makes it particularly desirable that the seal be economical both in its original cost and the expense of installation.

The present invention provides a valve stem seal assembly which adequately meets the foregoing requirements by providing a construction comprising a sheet metal retainer assembled with a thin sheet of wear-resistant filled Teflon seal material. The seal material has an extending frustoconical lip which is held in engagement with the valve stem by resilient fingers of the sheet metal retainer and is sufficiently long to provide for reasonable eccentricity between the valve stem and the seal mounting. Varying alternate embodiments of the seal assembly provide for mounting either in a counterbore at the end of the valve guide or on the outer diameter of the valve guide itself. In both arrangements, radial flange portions of the seal assembly provide for sealing on a surface of the valve guide. One embodiment of the design is arranged to have the seal lip formed in place after installation on the valve guide so that concentricity of the seal with the valve stem is assured.

These and other features of the present invention will be more clearly seen from the following description of selected embodiments chosen for purposes of illustration, referring to the drawings, in which.

Figure 1:
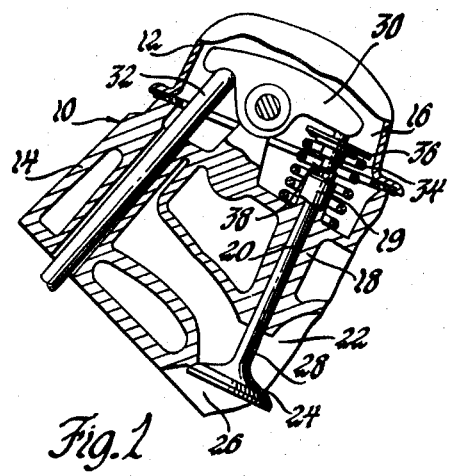
FIG. 1 is a fragmentary cross-sectional view of an internal combustion engine utilizing a valve stem seal assembly according to the invention.

Referring more specifically to the drawings, numeral 10 generally indicates an internal combustion engine having a rocker cover 12 mounted on a cylinder head 14 to enclose a valve mechanism chamber 16. Cylinder head 14 has integrally formed therein a plurality of valve guides 18, only one of which is shown in order to simplify the drawings. Valve guides 18 terminates in a cylindrical projecting portion 19 and includes an axial bore 20 which extends between cavity 16 and an intake passage 22 of the cylinder head.

A poppet valve 24 controls the flow of fluid from passage 22 to the engine combustion chamber 26 and includes a stem 28 which is reciprocably disposed in bore 20 extending therethrough into cavity 16. The end of the valve stem is engaged by valve-actuating mechanism comprising rocker arm 30 and pushrod 32 to reciprocably actuate the valve in a conventional manner. A coil spring 34 extends between the cylinder head and a valve carried seat member 36 to bias the valve in a closing direction.

At the upper end of the valve guide, a valve stem seal assembly 38 formed in accordance with the present invention is provided to limit the leakage of lubricating oil from chamber 16 between the valve stem 28 and valve guide 18 into the intake passage 22.

Figure 2:
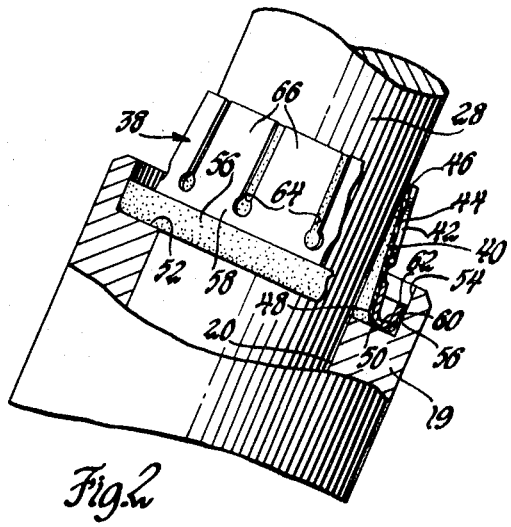
FIG. 2 is an enlarged cross-sectional view showing the seal installation of FIG. 1.

As shown in FIG. 2, seal assembly 38 comprises a thin sheet of seal material 40 retained and supported by a sheet metal retainer 42. Seal material 40 preferably consists of a filled polytetrafluoroethylene (Teflon) material having high resistance to abrasive wear, one example of which is a homogeneous mixture containing 70 percent Telfon, 19 percent glass and 11 percent red lead oxide. The material is relatively thin, having, for example, a thickness of approximately 0.015 inches and is formed with a frustoconical lip 44 having the smaller diameter end 46 in contact with the valve stem 28. The larger diameter end 48 connects with a radial flange portion 50 which sealingly engages the end surface 52 of a counterbore 54 formed in the end 19 of the valve guide. At the outer edge of flange portion 50, a short lip 56 extends upwardly to engage the sides of the counterbore 54.

Sheet metal retainer 42 is preferably formed of a spring steel and is substantially coextensive with seal material 40, having a frustoconical portion 58, a radial flange portion 60 and a short outer lip portion 62 lying along portions 44, 50 and 56 of the seal material, respectively. Frustoconical portion 58 includes a plurality of slots 64 extending from its small end about two-thirds of the distance to the larger end to form resilient fingers 66 which lie along the smaller end of lip 44 and urge the end 46 thereof into engagement with the valve stem. At the same time, lip 62 holds seal portion 56 into engagement with the counterbore 54 to hold the seal assembly tightly in place in the valve guide. The radial flange portion 50 of the seal material is held in sealing engagement with surface 52 by portion 60 of the retainer.

Seal lip 44 and resilient fingers 66 are of substantial length to provide allowance for slight eccentricity of the counterbore or retainer lip with respect to the valve guide bore.

Figure 3:
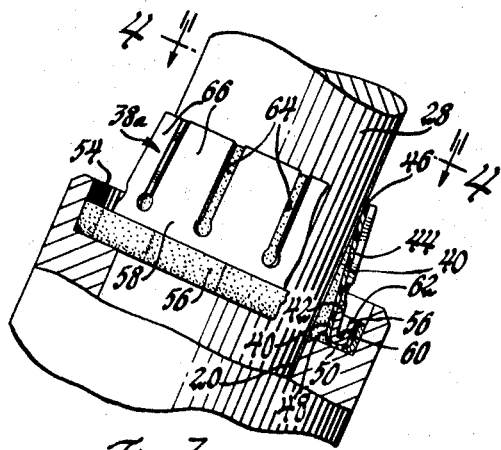
FIG. 3 is an enlarged cross-sectional view of a seal installation similar to FIG. 2 but in which the seal assembly includes modified retention means.
Figure 4:
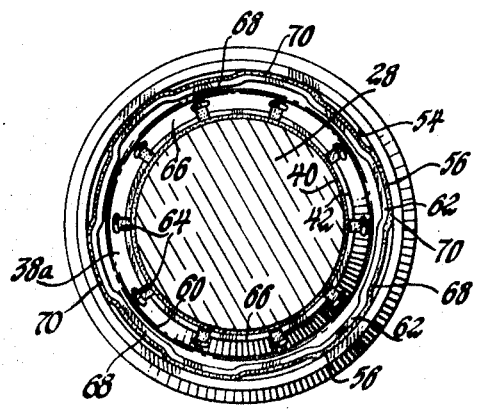
FIG. 4 is a cross-sectional view of the construction of FIG. 3 taken in the plane indicated by the line 4—4 of the Figure.

Referring now to FIGS. 3 and 4, the construction 38a is identical to that of FIG. 2 with the exception that lips 56 and 62 of the seal material and retainer, respectively, are crimped to have alternately inwardly and outwardly deformed portions 68 and 70, respectively, to stiffen the lip and provide for better retention in the counterbore. It should be apparent that, if desired, the short lip portion 56 of the seal material could be eliminated and lip 62 of the retainer made slightly larger to engage directly the counterbore 54.

Figure 5:
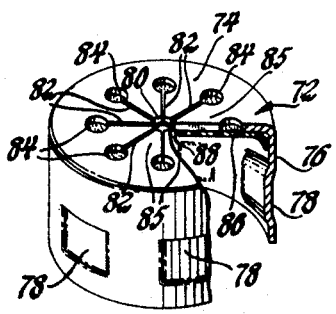
FIG. 5 is a pictorial view of an alternative embodiment of a seal assembly according to the invention shown in a partial state of completion and partially broken away to show certain details of the construction.
Figures 6, 7:
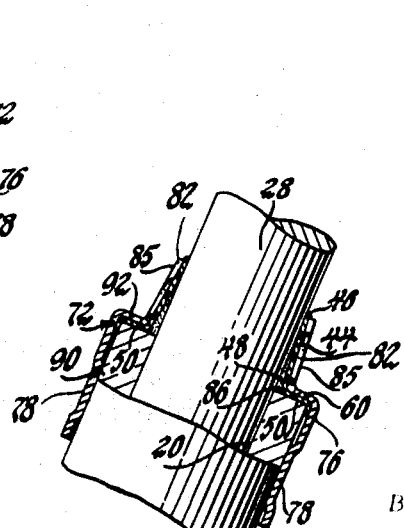
FIG. 6 is a cross-sectional view showing the seal of FIG. 5 in completed state as installed in an engine.
FIG. 7 is a cross-sectional view similar to FIG. 6 but showing a seal having alternate retention means.

Referring now to FIGS. 5 and 6, an alternate embodiment of the invention is shown before and after installation. This embodiment includes a sheet metal retainer 72 formed in a cuplike shape having a generally flat base 74 and a cylindrical sidewall 76. Sidewall 76 includes indentations 78 for a purpose to be subsequently described. The base includes a small central opening 80 having a plurality of slots 82 radiating outwardly therefrom. The slots 82 terminate about two-thirds of the way to the edge in small openings 84, thus forming a plurality of inwardly extending resilient fingers 85.

Disposed along the inner surface of the base 74 is a thin disc 86 of seal material formed from a wear-resistant filled Teflon material. Disc 86 has a central opening 88 approximately equivalent in size to opening 80 and its outer diameter is slightly larger than the interior of wall 76 so that the disc is retained in place upon installation.

The construction shown condition FIG. 5 is ready to be installed upon a valve guide 90 of the type shown in FIG. 6, which is identical to that shown in FIGS. 2 and 3 except for the absence of the counterbore. The seal assembly is installed on the valve guide before installation of a valve in the guide and this is accomplished by forcing the sidewall 76 over the outside of the guide so that it is gripped by the indentations 78 which then retain the assembly in place on the end of the valve guide.

When the assembly is in place, a forming tool (not shown) having essentially the diameter of valve stem 28 is thrust upwardly through the valve guide, forcing the inner portions of disc 86 upwardly. Due to the formability of the Teflon material, the disc portion is deformed by this action into a frustoconical lip 44 similar to that of FIG. 2. At the same time fingers 85 are bent upwardly between the locations of openings 84 to support portion 44 of the seal material and urge its smaller diameter end 46 inwardly such that upon installation of the valve stem 28 in the guide, the seal is held in engagement therewith as shown in FIG. 6.

The outer portion of disc 86 remains in place to form a radial flange portion 50 and is retained in engagement with the end 92 of the valve guide by a mating radial flange portion 60 which is formed by the portion of base 74 outboard of openings 84.

The forming in place of the seal lip and bending of the spring fingers to their final positions in the manner described has the advantage that the seal opening is automatically aligned with the valve guide bore thus accounting for greater eccentricity of the bore and the guide outer diameter than would be the case with a seal assembly completely formed prior to assembly.

Referring to FIG. 7, a seal construction identical to that of FIG. 6 is shown except that indentations 78 are eliminated from the retainer member and are replaced by inwardly deformed barbs 94 which retain the seal assembly in place by gripping the outer surface of the valve guide.

I claim:

1. A valve stem seal assembly for use in an internal combustion engine having a valve guide which terminates in a cylindrical projection surrounding a longitudinal bore and a poppet valve with a stem reciprocably received in said bore, said seal assembly comprising a sheet of wear-resistant filled Teflon material of uniform thickness and sufficiently thin to be easily formable, said material having a relatively long generally frustoconical lip with an end of smaller inner diameter adapted to sealingly engage the valve stem and having progressively increasing inner diameters to the other end which is of larger inner diameter so as to provide clearance to accommodate valve eccentricity, said larger diameter end merging into a radial flange portion adapted to sealingly engage a radial surface of the valve guide, a sheet metal retainer having a plurality of resilient fingers lying along and supporting the outer surface of said lip and terminating close by said smaller diameter end, said fingers urging said smaller diameter end inwardly to engage the valve stem, a radial flange supporting said resilient fingers and maintained in surface engagement with the radial flange portion of said material to hold said radial flange portion in contact with said valve guide radial surface and a generally cylindrical portion of said retainer extending from the outer edge of said retainer flange in the direction generally opposite said fingers, said cylindrical portion being adapted to fit over said valve guide cylindrical projection, and portions of said retainer cylindrical portion being deformed inwardly to tightly engage the outer surface of said valve guide projection so as to retain said seal assembly in place on said valve guide.

2. The seal assembly of claim 1 wherein said sheet metal retainer includes a frustoconical portion having smaller and larger diameter ends and an interior surface entirely in contact with and supporting the outer surface of said frustoconical lip, said resilient fingers forming a part of said portion and being separated by a plurality of slots extending from said smaller diameter end at least part way to the larger diameter end.

3. The seal assembly of claim 1 wherein said retainer and said Teflon material are formed to their final configuration after installation on said valve guide, said retainer being first formed as a cuplike member having a flat base and a generally cylindrical sidewall, said base having a small central opening and a plurality of slots extending radially outwardly from said opening to a diameter intermediate said opening and said sidewalls, the slotted portion of said base comprising said resilient fingers and the remaining portion of said base comprising said radial flange and said Teflon material being first formed as a flat disc having a small central opening and being disposed against the inner surface of the base of said cup with its outer edges engaging the cup walls, said cuplike member being receivable upon said valve guide cylindrical projection with the outer edges of said Teflon material in contact with the end of said valve guide whereby, upon insertion of closely fitting forming means in said valve guide bore and forcible movement of said forming means against said Teflon material, the inner portion of said Teflon material and said resilient fingers are deformed axially to form said frustoconical lip with said fingers lying therealong and urging said lip inwardly.

4. A valve stem seal assembly for use in an internal combustion engine having a valve guide with a longitudinal bore, said valve guide terminating in a cylindrical projection surrounding said bore, and a poppet valve with a stem reciprocably received in said bore, said seal assembly comprising a sheet metal retainer formed in a cuplike shape having a flat base integral with a generally cylindrical sidewall, said base including a small central opening and a plurality of radial slots extending outwardly from said opening to a diameter intermediate said opening and said sidewalls to form resilient fingers therebetween, said sidewall being sized to fit closely over said valve guide projection and having means to retain said assembly in place thereon, and a thin disc of wear-resistant filled Teflon material, said disc being received in said cuplike retainer against the base thereof and having outer edges contacting said sidewalls and a small central opening generally aligned with the retainer opening, whereby, upon installation of said assembly on said valve guide with the outer portion of said disc in engagement with the end of said guide and the insertion of closely fitting forming means in said guide bore, the forcing of said forming means against said disc and out said bore will stretch the inner portion of said disc into a frustoconical lip and bend said resilient fingers upwardly to form an extended lip seal centered on said bore and urged inwardly by said resilient fingers.

5. The assembly of claim 4 wherein said retainer includes a relieved opening at the outer end of each of the said radial slots to aid the bending of said resilient fingers in the desired location.

* * * * *